July 20, 1971 A. R. JONES 3,594,129
SINGLE-CHANNEL ANALYZER
Filed Sept. 3, 1969 5 Sheets-Sheet 1
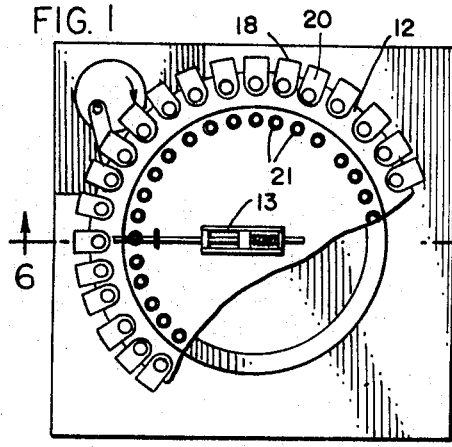
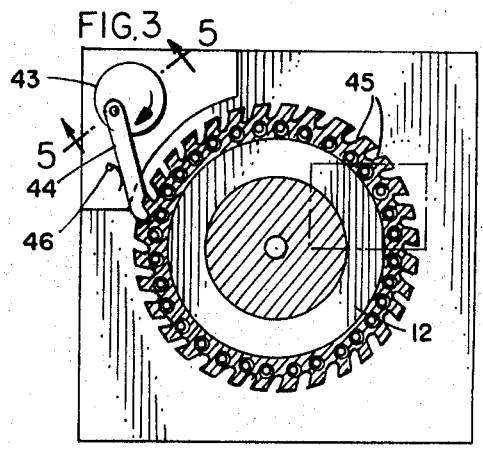
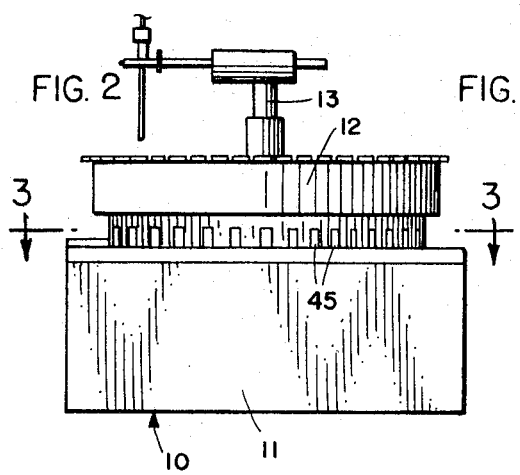
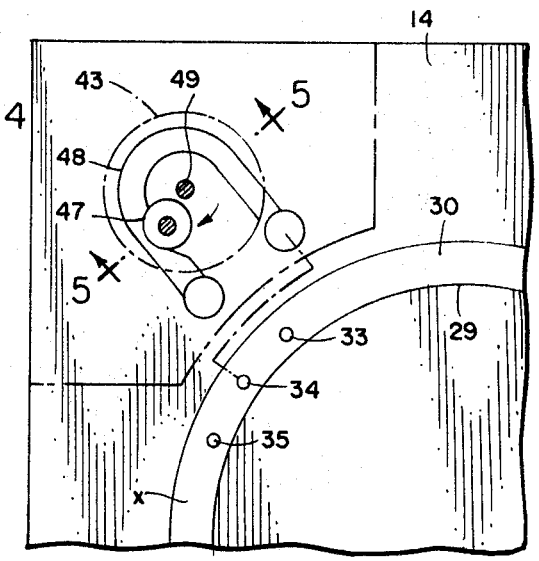
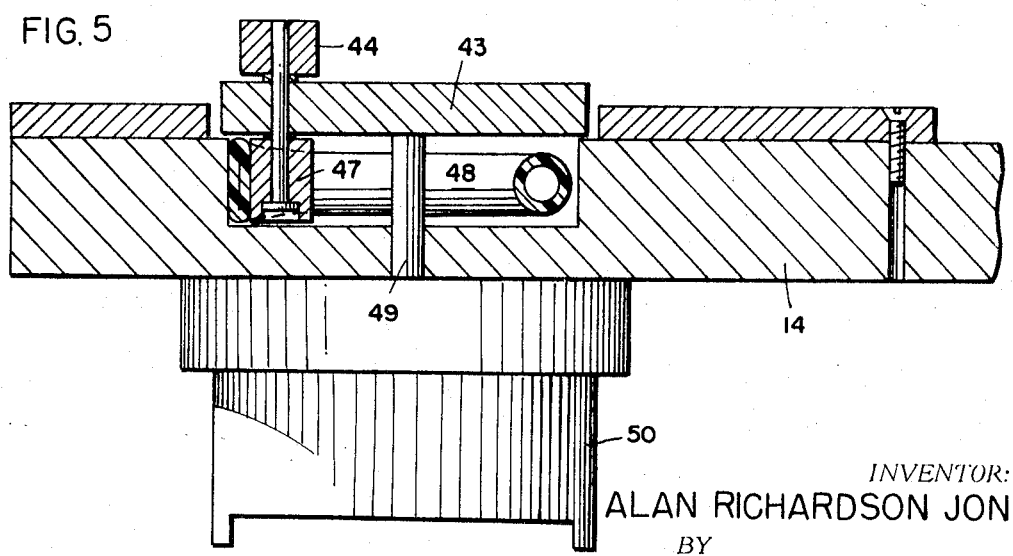
INVENTOR:
ALAN RICHARDSON JONES
BY
ATT'YS

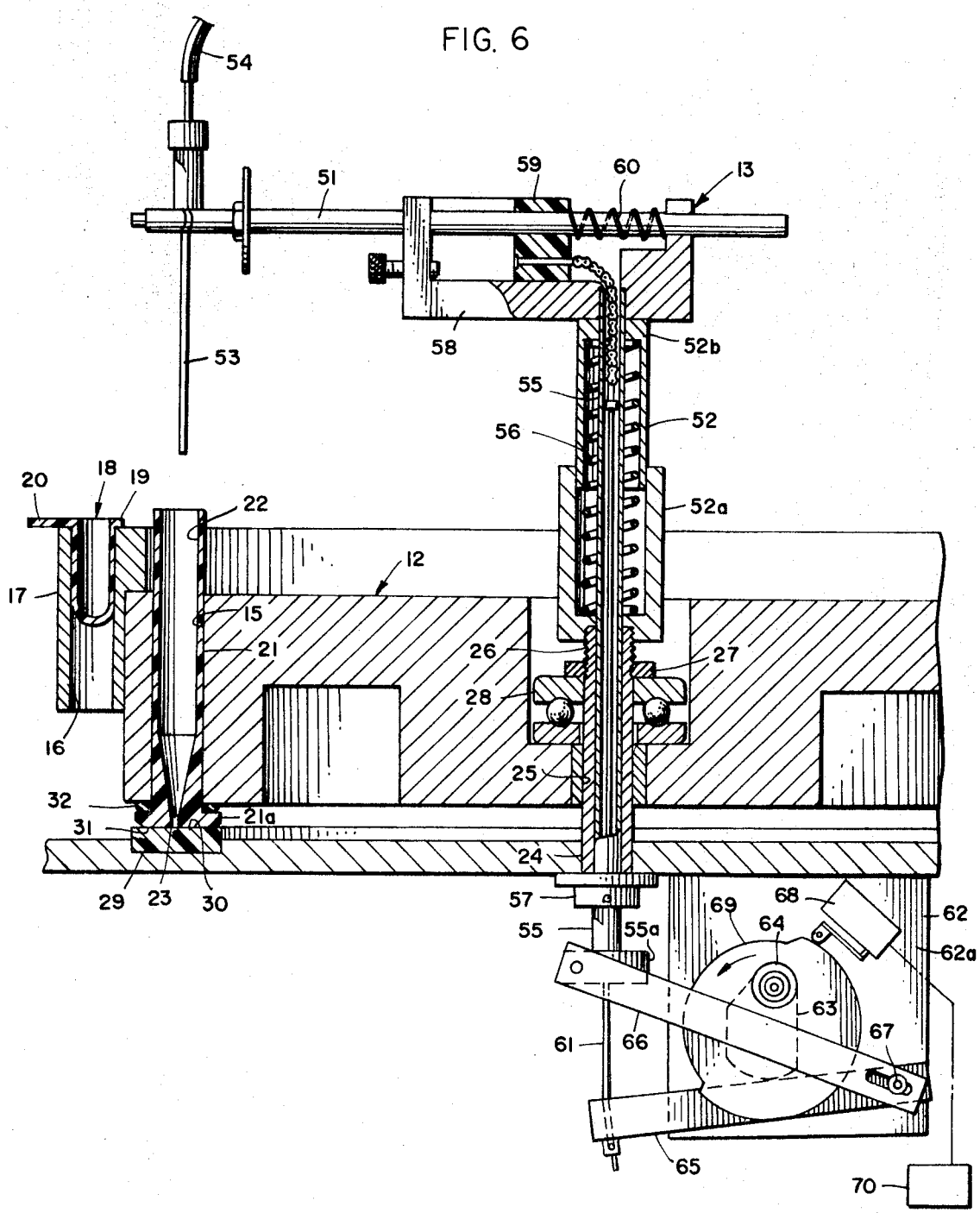

INVENTOR:
ALAN RICHARDSON JONES
BY
Dawson, Tilton, Falloy & Lungmus
ATT'YS

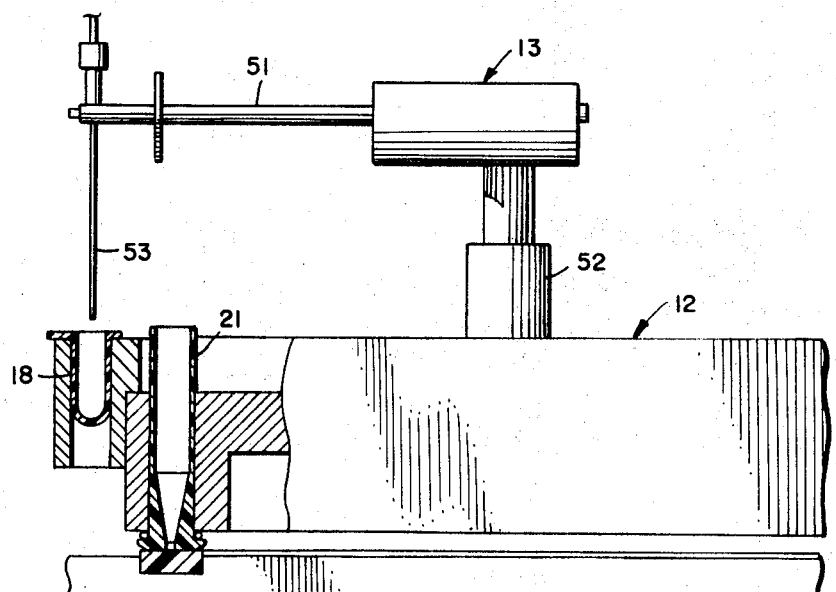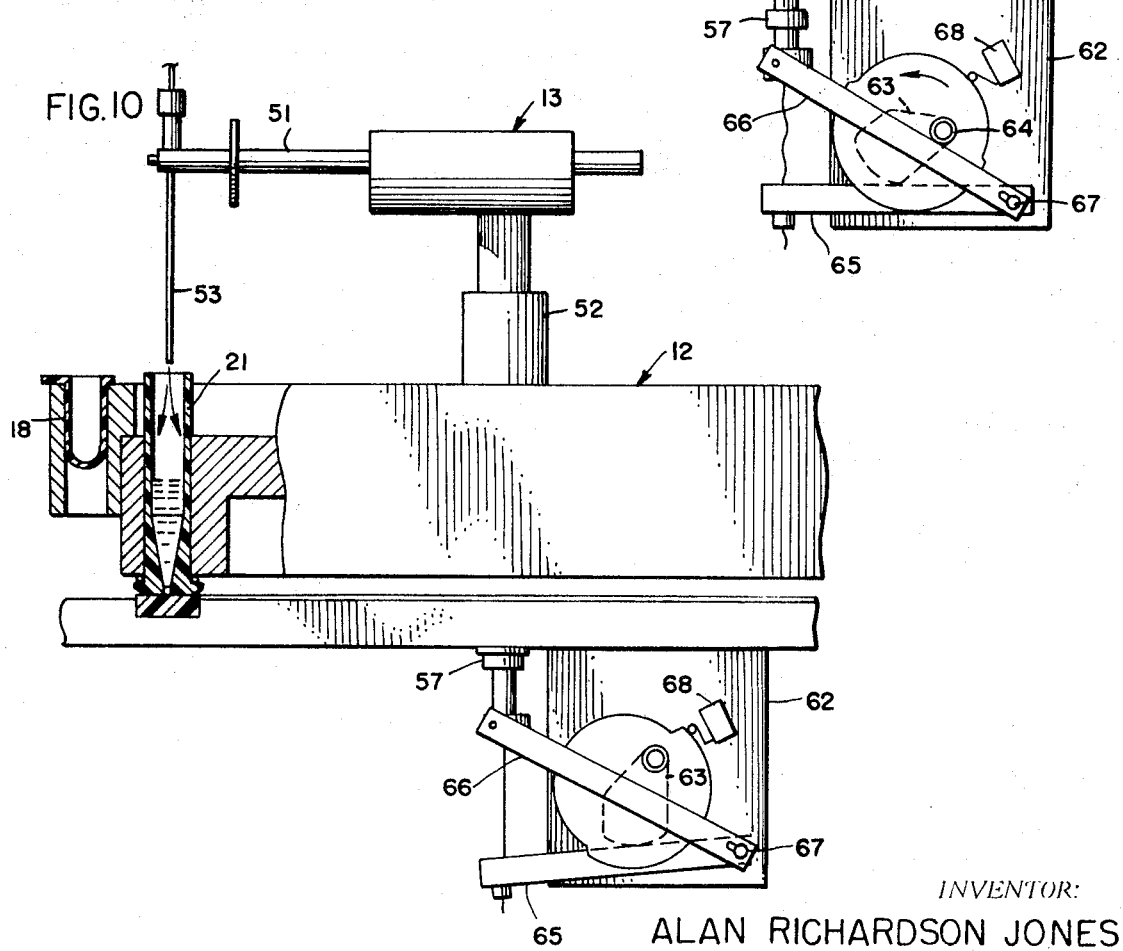

United States Patent Office 3,594,129
Patented July 20, 1971

3,594,129
SINGLE-CHANNEL ANALYZER
Alan Richardson Jones, Miami, Fla., assignor to American Hospital Supply Corporation, Evanston, Ill.
Filed Sept. 3, 1969, Ser. No. 854,968
Int. Cl. G01n *1/10, 1/14*
U.S. Cl. 23—253        21 Claims

ABSTRACT OF THE DISCLOSURE

An apparatus especially suited for use in automated chemical analysis. A plurality of open ended reaction tubes are carried by a turntable with the lower ends of the tubes slidably and sealingly engaging the contact surface of a platform. The chambers of the reaction tubes are therefore closed at their lower ends by the contact surface and standard clinical chemistry tests or reactions may thus be carried out in such chambers. Openings in the contact surface along the path of travel of the reaction tubes, in conjunction with conduits and apparatus communicating with such openings, result in the successive draining of each tube's contents, the colorimetric analysis of such contents, and the subsequent flushing and rinsing of each tube. A transfer mechanism coordinated in its operation with the turntable withdraws measured portions of fluid samples carried by cups supported by the turntable and discharges those measured portions along with a measured volume of a test reagent into the reaction tubes. Each reaction tube has a downwardly tapered chamber and, like the contact surface of the platform, is formed from a resilient plastic material which will insure a fluid-tight seal between the surfaces of the slidably-engaging parts.

BACKGROUND AND SUMMARY

Automatic chemical analyzers for use in clinical laboratories have been relatively complex in construction and operation. In analyzers in which the test reactions are carried out in conventional test tubes, the reactants are first added to the tubes and then, after a predetermined interval, a measured volume is withdrawn from each tube and is advanced to a colorimeter for analysis. Any fluid remaining in the test tubes must thereafter be completely removed; otherwise the accuracy of subsequent tests conducted in the same tubes will be adversely affected. It is apparent, however, that thorough washing and rinsing of a tube may be difficult if not impossible to perform while such a tube remains supported in upright position in the apparatus, and removal or inversion of the tubes for cleaning, if performed automatically, would obviously greatly complicate the design and operation of the equipment and, if performed manually, would be time consuming for an operator and would tend to offset the advantages of automation in other areas of the analytical procedure.

Accordingly, it is a main object of the invention to provide a single-channel analyzer having a plurality of reaction tubes which may be effectively filled, flushed, drained and re-used without interfering with operation of the apparatus and without altering the upstanding vertical orientation of each of the tubes. The term "single channel" is used herein to refer to an analyzer adapted to run only one type of diagnostic test (but on a plurality of samples, if desired) at any given time, for colorimetric analysis at the single wavelength required by that test.

An important aspect of the invention lies in the discovery that the reaction tubes for such an analyzer may be open at both ends and that the lower ends may be normally sealed off by a forceful but slidable contact with a smooth flat surface. Interruption of that seal permits gravity discharge of the tube's contents, or a draining of rinsing fluid, whichever the case may be, and thereby overcomes a major problem in automatic analyzer construction and operation.

Another object is to provide a single-channel analyzer which is relatively simple in structure and operation and which is therefore less subject to maintenance, service and repair problems than conventional automatic analyzers.

Other objects and advantages of the invention will appear as the specification proceeds.

DRAWINGS

FIG. 1 is a top plan view of an analyzer embodying the present invention, the turntable of the analyzer being partially broken away to illustrate the sealing or contact surface of the platform;

FIG. 2 is a side elevational view of the analyzer;

FIG. 3 is a horizontal sectional view taken along line 3—3 of FIG. 2;

FIG. 4 is an enlarged view illustrating the pumping means of the analyzer and showing in schematic fashion some of the connections and components thereof;

FIG. 5 is a still further enlarged vertical sectional view taken along line 5—5 of FIGS. 3 and 4;

FIG. 6 is an enlarged vertical sectional view taken along line 6—6 of FIG. 1;

FIG. 9 illustrates the relationship of parts after a sample has been drawn and horizontal retraction of the transfer mechanism is about to commence;

FIG. 10 illustrates the relationship of parts as a reaction tube is being filled;

DESCRIPTION

Figure 7:
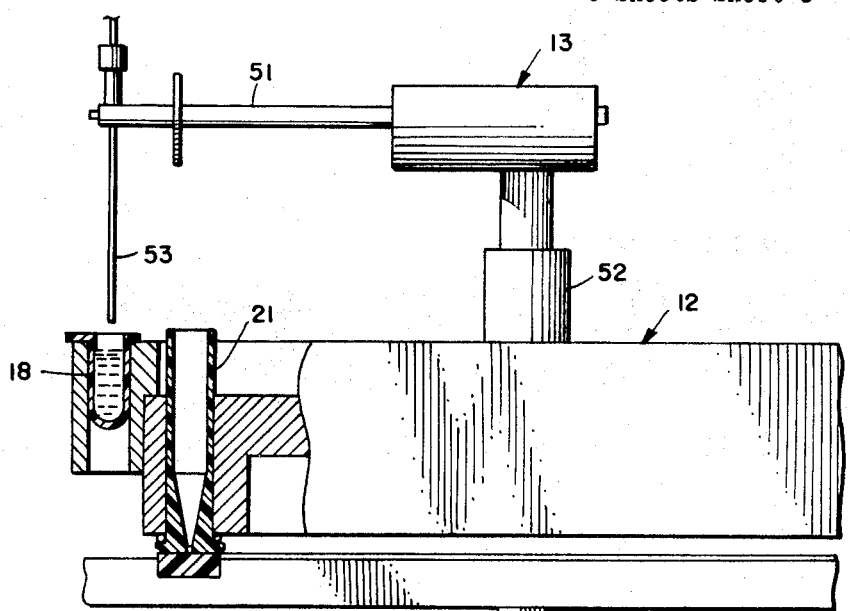
FIG. 7 is a view similar to FIG. 6 but in smaller scale illustrating the relationships of the parts as a cycle of operation commences.

Referring to FIGS. 1 and 2 of the drawings, the numeral 10 generally designates an analyzer having a base 11, a turntable 12, and a fluid transfer and delivery assembly 13. The base has a flat platform or top 14 and the generally cylindrical turntable 12 is disposed directly above that platform for rotation about a vertical axis.

In the illustration given, turntable 12 is provided with two concentric series of openings 15 and 16 (FIG. 6). If desired, the outer series of openings 16 may be formed in a ring 17 which is a detachable part of the turntable. Each of the circumferentially-spaced and vertically-extending openings 16 is adapted to receive a sample cup or container 18 which is closed at its lower end and which is provided at its upper end with a rim 19 and tab 20. As shown in FIGS. 1 and 6, the tabs 20 project radially outwardly beyond the periphery of the turntable to facilitate removal and replacement of the cups. Such cups may be formed of any suitable material such as plastic and are intended to be discarded after a single use. Polypropylene has been found effective as a fabricating material for the cups, but any other suitable material may be used.

The inner series of circumferentially-spaced and vertically-extending openings 15 receives a plurality of reaction tubes 21. As illustrated most clearly in FIG. 6, each reaction tube is generally cylindrical in shape but is provided with an enlarged lower end portion 21a of substantially greater diameter than opening 15. The chamber 22 of the reaction tube is also generally cylindrical except for the lower portion thereof which tapers downwardly and inwardly, terminating in a reduced lower end opening 23. It will be observed that the upper end of said tube is open and projects above the top surface of turntable 12.

Each of the multiple reaction tubes is formed of a resilient plastic material which has high chemical resistance and which has waxy and self-lubricating properties. Fluorocarbon polymers such as, for example, polymerized tetrafluoroethylene have been found particularly effective, but other materials having similar properties, such as, polytrifluorochloroethylene and polypropylene might also be used.

The turntable 12 is rotatably mounted upon an upstanding hollow shaft 24 secured to platform 14 (FIG. 6). The hollow shaft 24 extends upwardly through opening 25 in the turntable and is threaded at its upper end 26 (FIG. 6). A nut 27 is threaded upon the shaft's upper end and is tightened against thrust bearing 28 to exert a downward force of selected magnitude against the turntable.

Platform 14 includes an annular insert 29 having a flat smooth upwardly-facing contact surface 30 directly beneath reaction tubes 21. The flat bearing surfaces 31 at the underside of each reaction tube and about lower opening 23 of that tube is held in tight (but slidable) sealing engagement with the contact or sealing surface 30 of platform insert 29 by means of proper adjustment of nut 27.

Like reaction tubes 21, insert 29 is preferably formed of a resilient plastic material which has high chemical resistance and which has waxy and self-lubricating properties. Polytetrafluoroethylene has been found particularly effective, but other fluorohydrocarbons and other plastics having similar properties may also be used.

It has been found that the force necessary to maintain a fluid-tight sealing engagement between the bearing surfaces 31 of the reaction tubes and the contact surface 30 of the platform may be effectively controlled and maintained by interposing resilient compression rings 32 between the enlarged lower ends 21a of the reaction tubes and the undersurface of the turntable (FIG. 6). Such rings, which may be formed of rubber or any suitable resilient plastic material, also serve the important function of equalizing, or tending to equalize, the force exerted by such reaction tubes against the contact surface. The result is a turntable which supports a multiplicity of open-ended reaction tubes, the lower ends of the tubes being normally maintained in sealed condition by a fluid-tight sliding seal between the bearing surfaces of those tubes and the contact surface of the platform.

Figure 11:
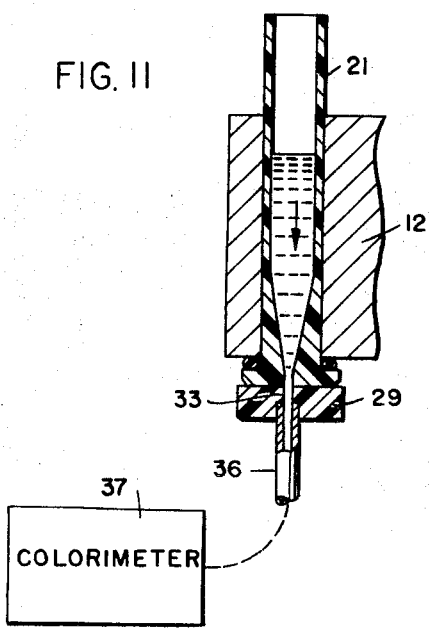
FIGS. 11–13 illustrate somewhat schematically the operations which occur in a reaction tube of the analyzer at different positions of the turntable.

In the embodiment of the analyzer illustrated in the drawings, the lower end of each reaction tube remains sealed except when the bottom opening of that tube is in register with port 33, port 34, or port 35 in insert 30 and platform 14 (FIG. 4). When a reaction tube has its lower opening in communication with port 33, the fluid contents of the tube drain through port 33 under the influence of gravity and pass through conduit 36 to a colorimeter 37, as indicated somewhat schematically in FIG. 11. Thus, a reaction tube positioned directly above port 33 is in a discharge or testing station. Since the contents drain from the open lower end of the tube instead of being extracted from the tube's open upper end, no significant amounts of fluid remain within the drained tube. The fact that such tubes are formed from a plastic having a waxy non-wetting surface also contributes to complete discharge of the contents of such reaction tubes.

Figure 12:
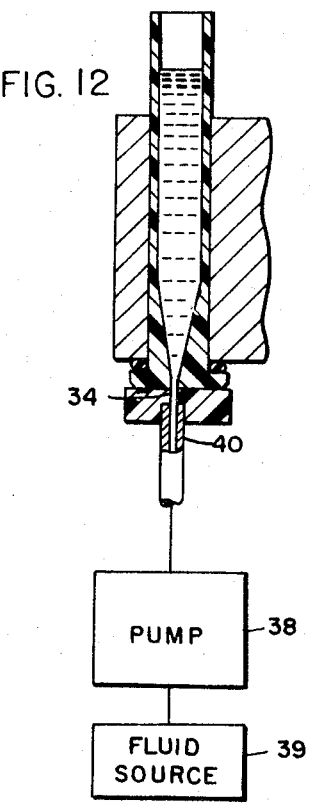
Figure 13:
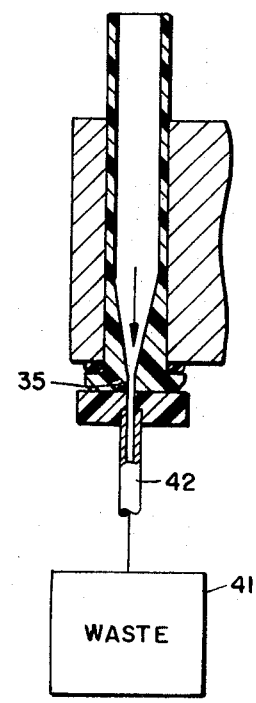

Since even a minute trace of fluid from a prior test might have an undesirable effect upon the results of a subsequent test, port 33, which is spaced a relatively short angular distance from port 33 in the direction of rotation of the turntable, communicates with a pump 38 and a source of rinsing fluid 39 by means of conduit 40 (FIG. 12). When each reaction tube is disposed above port 34 with its lower opening in communication with that port, a rinsing fluid, which is normally distilled water but which may be any other suitable fluid, is forced upwardly into the reaction tube to fill or partially fill that tube. Thereafter, the reaction tube advances from its position above inlet port 34 to a position above drain port 35, the drain port communicating with a suitable waste receiver 41 by means of conduit 42 (FIG. 13). Therefore, after the rinsing fluid has drained therefrom, the inside walls of each reaction tube are clean and the chamber of that tube, after again being sealed by contact surface 30, is ready to receive the fluid for a new test.

Rotation of the turntable might either be continuous or incremental, although the latter is preferred. Any suitable intermittent drive means may be utilized; in the illustration given, a motor-driven disk 43 and an eccentrically-mounted driving arm 44 transmit driving force to the turntable at regularly timed intervals. It will be observed from FIG. 3 that the lower portion of the turntable is provided with a multiplicity of uniformly-spaced circumferential notches 45 and that the free end of driving arm 44 successively engages each of such notches to drive each reaction tube from one stopping station to the next. A spring 46 bears against driving arm 44 and serves to maintain the free end of the arm in operative relation with respect to the turntable.

FIG. 4 illustrates the drive disk 43 in phantom view and reveals that the underside of that disk is equipped with an eccentrically-mounted roller 47 which bears against a resilient tube 48 during a substantial portion of the annular path of travel of the roller about the axis of shaft 49. The relationship of parts is most clearly illustrated in FIG. 5 where it will be observed that motor 50 not only drives the roller 47 which forms one part of the pump assembly but also drives arm 44 which engages and advances turntable 12.

After a reaction tube has been rinsed and drained at the stations represented by ports 34 and 35, it advances to a filling station or zone which, in the illustrated embodiment, is positioned at point x in FIG. 4. At that station the cleansed tube receives a fluid sample along with a test reagent, and throughout the remainder of the tube's travel from the filling station to discharge port 33, the test reaction (if any is to occur) takes place. The optimum conditions for the test which the analyzer is to conduct, and the rate of advancement of the turntable, will determine the proper angular distance between point x and discharge port 33, and it is to be understood that the location of the filling station or zone x may be adjusted to suit the requirements of the particular test. While filling of the reaction tubes with sample and test reagent may occur from below through a port in the platform in much the same manner as rinsing fluid is introduced through port 34, it has been found particularly effective to introduce the reaction fluids through the open tops of the reaction tubes by means of transfer assembly 13.

The transfer assembly is illustrated in FIGS. 1, 2 and 6, and consists essentially of a generally horizontal arm carried upon telescoping post 52 and equipped at its distal end with a depending tubulet 53 which communicates through conduit 54 with a "diluter" of the type disclosed in Pat. 3,446,400 or with any other apparatus capable of operating to draw a measured amount of fluid upwardly into tubulet 53 and then discharging that measured amount of sample fluid along with an additional measured volume of reagent. As is well understood in the art, the particular reagent to be discharged with the drawn sample into a reaction tube 21 depends on the particular analytical test to be performed.

The extensible post 52 includes lower and upper telescoping sections 52a and 52b, the lower section being threadedly secured to the upper end of mounting tube 26 and the upper section 52b being attached at its upper end to a reciprocable central tube 55 of relatively small diameter which extends downwardly through section 52a and through mounting tube or shaft 26. A helical compression spring 56 extends between the upper and lower sections of the telescoping post and urges the upper section into the raised position illustrated in FIG. 6. A stop member 57 secured to central tube 55 adjacent the lower end thereof limits the extent of upward movement of the parts under the influence of spring 56.

Horizontal arm 51 is slidably carried by a mounting member 58 which is fixed to the upper end of telescoping section 52b. Within the hollow mounting member is a slide block or element 59 which is fixed to arm 51 and which travels horizontally within the mounting member as arm 51 is extended and retracted. Compression spring 60 normally urges the arm 51 and the tubulet carried at the distal end thereof into a horizontally extended position whereas retraction is achieved by downward movement of a table 61 which is connected at its upper end to element 59 and which extends downwardly through central tube 55.

Movement of the tubulet between a horizontally extended position over a sample cup and a horizontally retracted position over a reaction tube, and between elevated and lowered positions, is achieved by motor 62, cam 63, roller 64, and levers 65 and 66. Lever 65 is pivotally carried on motor plate 62a by pin 67 and has its opposite end connected to the lower end of cable 61 (FIG. 6). As the driving motor operates, cam 63 engages the upper surface of lever 65 to urge it downwardly, thereby retracting arm 51 and tubulet 53 into the horizontally retracted position illustrated in FIGS. 6 and 10. On the other hand, when cam 63 is rotated out of engagement with lever 65, arm 51 and tubulet 53 are shifted into the extended position illustrated in FIGS. 7, 8 and 9.

Figure 8:
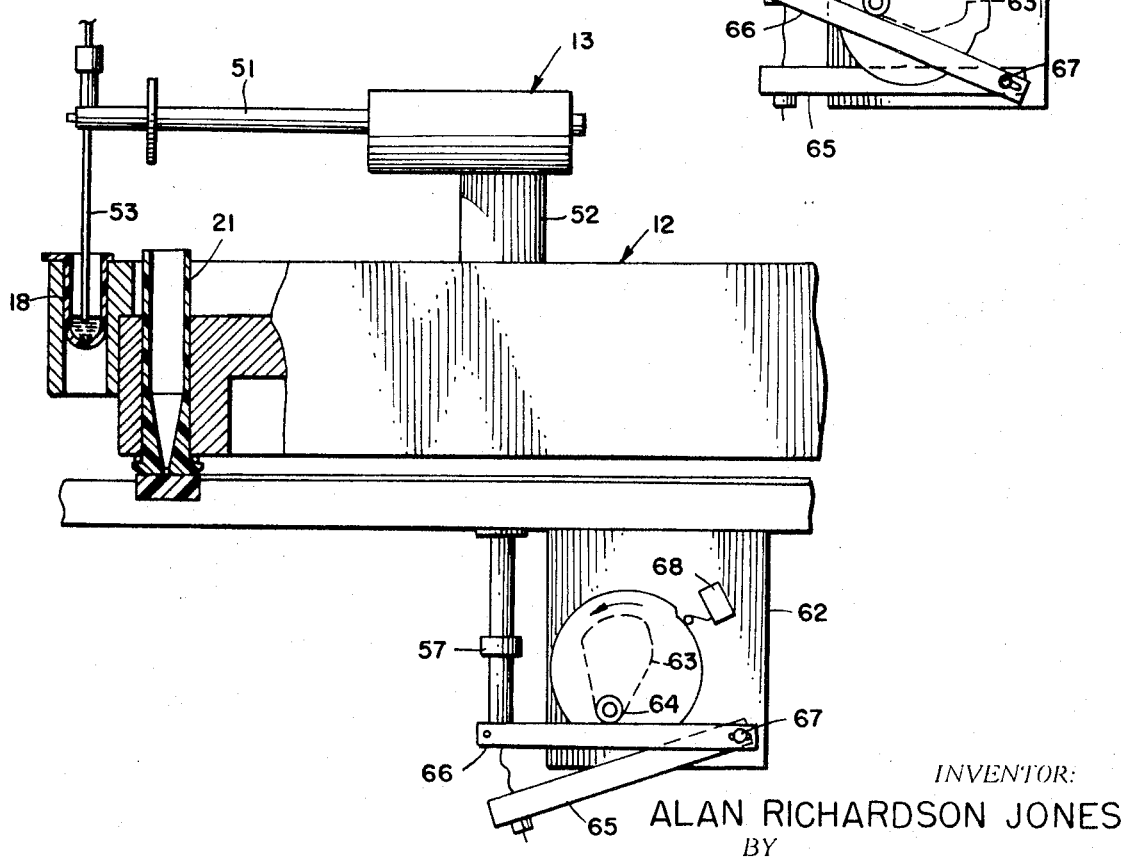
FIG. 8 is a view similar to FIG. 7 but showing the relationship of parts as a sample is being drawn.

Lowering and raising of the tubulet is synchronized with its extension and retraction and is achieved by the cooperative action between cam roller 64 and lever arm 66. Like lever 65, lever 66 is pivotally carried by pin 67. At its free end, lever 66 is pivotally joined to an enlargement 55a at the lower end of central tube 55. Therefore, when motor 62 drives roller 64 (in a counterclockwise direction as viewed in FIG. 6) into engagement with the upper surface of lever 66 and drives that lever downwardly, the upper and lower sections of post 52 are telescoped together and the tubulet 53 is shifted into its lowered position as illustrated in FIG. 8. As the roller swings upwardly, tube 55 and lever 66 return to their raised positions (FIGS. 6, 7, 9, and 10) under the influence of compression spring 56.

The sequence of steps in the filling operation is controlled by the relationship of the cams and levers described above, by a normally "off" microswitch 68 controlled by cam 69, and by an overriding timer 70 which also controls the diluter mentioned above and the motor 50 for turntable 12. With the parts as shown in FIG. 6, microswitch 68 is closed and both the turntable and the transfer assembly are stopped. The cycle commences when the overriding timer energizes the motor 50 to advance the turntable and at the same time energizes motor 62 to swing cam 63 out of engagement with lever 65, thereby permitting the tubulet 53 and arm 51 to move into the outwardly extended position illustrated in FIG. 7. Continued rotation of motor 62 causes cam roller 64 to swing into engagement with lever 66, thereby lowering the lever and causing the tubulet to shift into its lowered position as illustrated in FIG. 8. While the tubulet 53 is in its lowered position with its free end immersed in the sample fluid contained within cup 18, the timer 70 energizes the diluter to cause a portion of the sample to be drawn upwardly into the tubulet. Thereafter, the override timer again energizes motor 62 to rotate cam roller 64 upwardly, permitting lever 66 to swing into its raised position under the force of compression spring 56, the tubulet thereby moving upwardly towards its fully raised position (FIG. 9). In the final step of the operating cycle, continued operation of motor 62 brings cam 63 into contact with the upper surface of lever 65, thereby urging the lever downwardly and directing the tubulet into the retracted position illustrated in FIG. 10. While the tubulet is in that retracted position directly above a clean and empty reaction tube 21, the diluter (not shown) is again actuated to discharge into the reaction tube the sample portion just extracted from the adjacent sample cup, along with a measured volume of reagent. The forceable discharge of the reagent and sample into the tapered chamber of the reaction tube results in a thorough mixing of the reactants so that during the interval following the filling step and terminating during the later discharging and testing step (when the reactants are discharged under gravity through portion 33) the test reaction may take place.

While in the foregoing an embodiment of the invention has been disclosed in considerable detail for purposes of illustration, it will be understood by those skilled in the art that many of these details may be varied without departing from the spirit and scope of the invention.

I claim:

1. In a single-channel analyzer, a vertical reaction tube having openings at its upper and lower ends, the lower end of said tube having a smooth bearing surface extending about the lower end opening, said bearing surface of said tube slidably and sealingly engaging a smooth and generally horizontal sealing surface, a carrier supporting said tube and movable with respect to said sealing surface for sliding the bearing surface of said tube along said sealing surface, means for moving said carrier to advance said tube at a controlled rate along said sealing surface, said sealing surface having a discharge port therein registrable with the lower end opening of said reaction tube only when said tube is at a selected discharge station along said sealing surface, conduit means communicating with said discharge port for conveying fluid discharged from said reaction tube to a colorimeter, and means for introducing fluid into said tube at a filling station spaced before said discharge station along said sealing surface a distance corresponding with the time interval required for the reaction test selected to be performed.

2. The analyzer of claim 1 in which at least one of the surfaces constituting said bearing surface and said sealing surface is formed of resilient plastic material.

3. The analyzer of claim 2 in which both of said surfaces are formed of resilient plastic material.

4. The analyzer of claim 1 in which said carrier supports said tube for movement in an annular path along said sealing surface.

5. The analyzer of claim 1 in which said sealing surface is provided with an inlet port spaced in the path of movement of said tube after said discharge port and registrable with the lower end opening of said reaction tube, and means for introducing a stream of rinsing fluid upwardly through said inlet port and into said reaction tube when the lower end opening of said tube is in register with said inlet port.

6. The analyzer of claim 5 in which a drain port is provided in said sealing surface along the path of movement of said tube after said inlet port and before said fiilling station, said drain port being registrable with the lower end opening of said tube for draining rinsing fluid therefrom.

7. The analyzer of claim 1 in which said carrier comprises a turntable equipped with means for supporting a multiplicity of said reaction tubes in circumferentially-spaced relation.

8. The analyzer of claim 1 in which said means for introducing fluid into said tube at said filling station includes a tubulet positioned and arranged to introduce fluid through the open upper end of said reaction tube.

9. The analyzer of claim 8 in which said means for introducing fluid includes a transfer arm assembly supporting said tubulet, said transfer arm assembly being operative to shift said tubulet between a first position disposed directly above the path of movement of said reaction tube and a second position displaced outwardly from said path of movement, said carrier supporting a sample container adjacent to said reaction tube, said tubulet when in said second position being positioned for intake of a portion of said sample from said sample container for subsequent discharge into said reaction tube when said tubulet is moved to said first position.

10. The analyzer of claim 1 in which means are provided for urging said tube downwardly to maintain a slidable fluid-tight seal between said bearing and sealing surfaces.

11. In a single-channel analyzer, a platform and a generally cylindrical turntable mounted thereon for rotation about a vertical axis, means for rotating said turntable at a controlled rate, a plurality of reaction tubes supported by said turntable and arranged in an annular series about said axis, said platform providing a smooth annular sealing surface directly beneath said tubes, each of said tubes being open at its upper and lower ends and having about the opening of its lower end a smooth bearing surface slidably engaging said sealing surface, means urging said tubes downwardly to maintain said bearing and sealing surfaces in fluid-tight sealing engagement, means for introducing fluid into said tubes at a point along the annular path of travel thereof, a discharge port in said platform along said path of travel sequentially registrable with the lower end openings of each of said reaction tubes as said turntable is rotated, said port being spaced a selected angular distance from the point of introduction of fluid into said tubes, and conduit means communicating with said discharge port for conveying fluid discharged from said reaction tubes to a colorimeter.

12. The analyzer of claim 11 in which each of said reaction tubes has a lower end portion projecting downwardly beneath said turntable.

13. The analyzer of claim 12 in which the lower end portion of each of said reaction tubes is enlarged, said means for urging said tubes downwardly comprising a resilient compression member disposed between the enlarged lower end of each of said tubes and said turntable.

14. The analyzer of claim 11 in which at least one of the surfaces constituting said bearing surface of each tube and said sealing surface of said platform is formed of resilient plastic material.

15. The analyzer of claim 14 in which both of said surfaces are formed of resilient plastic material, said plastic material comprising polytetrafluoroethylene.

16. The analyzer of claim 11 in which said sealing surface is provided with an inlet port spaced a selected angular distance from said discharge port in the direction of movement of said turntable, said inlet port being registrable sequentially with the lower end openings of each of said reaction tubes as said turntable rotates, and means for introducing a stream of rinsing fluid upwardly through said inlet port and into said reaction tubes when the lower end opening of each tube is in register with said inlet port.

17. The analyzer of claim 16 in which a drain port is provided in said sealing surface at a selected angular distance from said inlet port and in the direction of movement of said turntable, said drain port being registrable sequentially with the lower end openings of said reaction tubes when said turntable is rotated for draining rinsing fluid from said tubes.

18. The analyzer of claim 11 in which said means for introducing fluid into said tubes includes a tubulet positioned and arranged to register sequentially with the upper end opening of said reaction tubes as said turntable is rotated for introducing fluid into said tubes.

19. The analyzer of claim 18 in which said means for introducing fluid also includes a transfer arm assembly supporting said tubulet, said transfer arm assembly being operative to shift said tubulet between a first position disposed directly above the path of movement of said reaction tubes and a second position displaced radially from said path of movement.

20. The analyzer of claim 19 in which a plurality of sample containers are supported by said turntable in an annular series concentric with the series of said reaction tubes, said tubulet when in said second position being registrable with said sample containers for withdrawing fluid samples therefrom and for discharging the same into said reaction tubes when said tubulet is moved to its first position.

21. The analyzer of claim 11 in which each of said reaction tubes defines a downwardly and inwardly tapering chamber, said lower end opening of each tube being substantially smaller than the upper end opening thereof.

References Cited
UNITED STATES PATENTS

| | | | |
|---|---|---|---|
| 3,193,359 | 7/1965 | Baruch et al. | 23—259 |
| 3,487,678 | 1/1970 | Thomson et al. | 23—253X |
| 3,489,521 | 1/1970 | Buckle et al. | 23—259 |
| 3,497,320 | 2/1970 | Blackburn et al. | 23—253X |

MORRIS O. WOLK, Primary Examiner

R. E. SERWIN, Assistant Examiner

U.S. Cl. X.R.

23—259; 73—425.4; 141—130